US010823418B2

United States Patent
Zelina et al.

(10) Patent No.: US 10,823,418 B2
(45) Date of Patent: Nov. 3, 2020

(54) GAS TURBINE ENGINE COMBUSTOR COMPRISING AIR INLET TUBES ARRANGED AROUND THE COMBUSTOR

(71) Applicant: General Electric Company, Schenectady, NY (US)

(72) Inventors: Joseph Zelina, Waynesville, OH (US); Sarah Marie Monahan, Latham, NY (US); Michael Anthony Benjamin, Cincinnati, OH (US); Venkat Eswarlu Tangirala, Niskyuna, NY (US); Sibtosh Pal, Mason, OH (US); William Thomas Ross, Renton, WA (US)

(73) Assignee: General Electric Company, Schenectady, NY (US)

( * ) Notice: Subject to any disclaimer, the term of this patent is extended or adjusted under 35 U.S.C. 154(b) by 764 days.

(21) Appl. No.: 15/447,847

(22) Filed: Mar. 2, 2017

(65) Prior Publication Data
US 2018/0252410 A1 Sep. 6, 2018

(51) Int. Cl.
*F23R 3/04* (2006.01)
*F23R 3/06* (2006.01)
(Continued)

(52) U.S. Cl.
CPC ............... *F23R 3/06* (2013.01); *F23R 3/002* (2013.01); *F23R 3/045* (2013.01); *F23R 3/42* (2013.01); *F23R 3/50* (2013.01); *F23R 3/58* (2013.01)

(58) Field of Classification Search
CPC .... F23R 3/06; F23R 3/42; F23R 3/425; F23R 3/52; F23R 3/54; F23R 3/002; F23R 3/045; F23R 3/58; F23R 3/50
See application file for complete search history.

(56) References Cited

U.S. PATENT DOCUMENTS 3,012,402 A 12/1961 Probert et al.
3,722,216 A 3/1973 Bahr et al.
(Continued)

FOREIGN PATENT DOCUMENTS

DE 10 04 866 B 3/1957
DE 19541303 A1 5/1997
(Continued)

OTHER PUBLICATIONS

Zelina, et al., Compact Combustion Systems Using A Combination of Trapped Vortex and High-G Combustor Technologies, GT2008-50090, ASME Turbo Expo, 53$^{rd}$ ASME International Gas Turbine and Aeroengine Congress and Exposition, Berlin, DE, May 2008, 9 Pages.

(Continued)

*Primary Examiner* — William H Rodriguez
(74) *Attorney, Agent, or Firm* — Dority & Manning, P.A.

(57) ABSTRACT

A combustor for a turbine engine includes an inner combustion liner and an outer combustion liner together defining at least in part an interior. The interior includes a combustion chamber and a main portion. The combustor also includes an inlet combustion liner at least partially defining the combustion chamber of the interior and including an inlet assembly. The inlet assembly includes at least two cavity air tubes arranged along the axial direction, each cavity air tube extending between an inlet and an outlet, the outlet of each cavity air tube in airflow communication with the combustion chamber for providing the combustion chamber with a flow of air.

17 Claims, 5 Drawing Sheets

(51) Int. Cl.
*F23R 3/00* (2006.01)
*F23R 3/42* (2006.01)
*F23R 3/58* (2006.01)
*F23R 3/50* (2006.01)

(56) References Cited

U.S. PATENT DOCUMENTS

| | | |
|---|---|---|
| 4,098,075 A | 7/1978 | Greenberg et al. |
| 4,246,758 A | 1/1981 | Caruel et al. |
| 4,301,657 A * | 11/1981 | Penny ............... F23R 3/12 60/748 |
| 4,445,338 A | 5/1984 | Markowski et al. |
| 4,606,190 A | 8/1986 | Greene et al. |
| 4,719,748 A | 1/1988 | Davis, Jr. et al. |
| 4,825,648 A | 5/1989 | Adamson |
| 4,875,339 A * | 10/1989 | Rasmussen ........... F23R 3/06 60/757 |
| 4,944,149 A | 4/1990 | Kuwata |
| 4,926,630 A * | 5/1990 | Shekleton ........... F02C 3/05 60/758 |
| 5,069,033 A * | 12/1991 | Shekleton ........... F23R 3/42 60/737 |
| 5,142,858 A | 9/1992 | Ciokajlo et al. |
| 5,205,117 A * | 4/1993 | Shekleton ........... F23R 3/002 60/778 |
| 5,207,064 A | 5/1993 | Ciokajlo et al. |
| 5,261,224 A * | 11/1993 | Shekleton ........... F23R 3/002 60/738 |
| 5,274,997 A * | 1/1994 | Inoue ............... F02C 7/105 165/8 |
| 5,277,021 A * | 1/1994 | Shekleton ........... F23R 3/002 60/804 |
| 5,277,022 A * | 1/1994 | Shekleton ........... F23R 3/54 60/737 |
| 5,279,126 A | 1/1994 | Holladay |
| 5,303,543 A * | 4/1994 | Shah ............... F01D 9/023 60/804 |
| 5,309,718 A * | 5/1994 | Loving ............. F23R 3/16 431/353 |
| 5,317,864 A * | 6/1994 | Shorb .............. F23R 3/28 60/804 |
| 5,363,644 A * | 11/1994 | Shekleton ........... F23R 3/04 60/760 |
| 5,454,221 A * | 10/1995 | Loprinzo ........... F23R 3/045 60/757 |
| 5,465,571 A | 11/1995 | Clark |
| 5,488,829 A | 2/1996 | Southall et al. |
| 5,590,530 A * | 1/1997 | Owen .............. F23R 3/045 60/748 |
| 5,613,363 A | 3/1997 | Joshi et al. |
| 5,619,855 A | 4/1997 | Burrus |
| 5,638,682 A | 6/1997 | Joshi et al. |
| 5,687,572 A * | 11/1997 | Schrantz ........... F23R 3/007 431/352 |
| 5,727,378 A * | 3/1998 | Seymour ........... F01D 25/125 60/732 |
| 5,735,466 A | 4/1998 | Kramer et al. |
| 5,791,148 A | 8/1998 | Burrus |
| 5,857,339 A | 1/1999 | Roquemore et al. |
| 5,918,458 A | 7/1999 | Coffinbeny et al. |
| 6,192,669 B1 * | 2/2001 | Keller ............. F23R 3/425 60/804 |
| 6,238,183 B1 | 5/2001 | Williamson et al. |
| 6,286,298 B1 | 9/2001 | Burrus et al. |
| 6,286,300 B1 | 9/2001 | Zelina et al. |
| 6,286,317 B1 | 9/2001 | Burrus et al. |
| 6,295,801 B1 | 10/2001 | Burrus et al. |
| 6,651,439 B2 | 11/2003 | Al Roub et al. |
| 6,729,141 B2 | 5/2004 | Ingram |
| 6,735,949 B1 | 5/2004 | Haynes et al. |
| 6,796,130 B2 | 9/2004 | Little et al. |
| 6,951,108 B2 | 10/2005 | Burrus et al. |
| 6,955,053 B1 | 10/2005 | Chen et al. |
| 7,318,317 B2 | 1/2008 | Carrea |
| 7,493,767 B2 | 2/2009 | Bunker et al. |
| 7,628,020 B2 | 12/2009 | Alkabie et al. |
| 7,681,399 B2 | 3/2010 | Orlando et al. |
| 7,762,058 B2 | 7/2010 | Pederson et al. |
| 8,011,188 B2 | 9/2011 | Woltmann et al. |
| 8,230,688 B2 | 7/2012 | Wilson et al. |
| 8,272,219 B1 | 9/2012 | Johnson et al. |
| 8,511,087 B2 | 8/2013 | Fox et al. |
| 8,689,562 B2 | 4/2014 | Kendrick |
| 8,720,182 B2 | 5/2014 | Jain |
| 8,720,257 B2 | 5/2014 | Krull et al. |
| 8,783,008 B2 | 7/2014 | Eroglu et al. |
| 8,794,006 B2 | 8/2014 | Chokshi et al. |
| 8,801,267 B2 | 8/2014 | Gentgen |
| 8,887,508 B2 | 11/2014 | Brown et al. |
| 9,052,114 B1 * | 6/2015 | Toqan ............. F23R 3/04 |
| 9,062,609 B2 | 6/2015 | Mehring et al. |
| 9,091,446 B1 * | 7/2015 | Toqan ............. F23R 3/34 |
| 9,181,812 B1 | 11/2015 | Toqan et al. |
| 2004/0003599 A1 * | 1/2004 | Ingram ............. F23R 3/50 60/804 |
| 2004/0216463 A1 * | 11/2004 | Harris ............. F23R 3/12 60/776 |
| 2007/0227150 A1 * | 10/2007 | Alkabie ........... F23R 3/04 60/754 |
| 2008/0041059 A1 * | 2/2008 | Teets ............. F23D 14/66 60/737 |
| 2008/0092544 A1 | 4/2008 | Rakhamilov |
| 2010/0083664 A1 * | 4/2010 | Mancini .......... F23R 3/14 60/752 |
| 2010/0115953 A1 | 5/2010 | Davis, Jr. et al. |
| 2010/0162684 A1 | 7/2010 | Baker |
| 2010/0242482 A1 * | 9/2010 | Kraemer .......... F23N 5/003 60/746 |
| 2011/0005231 A1 | 1/2011 | Low |
| 2011/0067378 A1 | 3/2011 | Tibbott et al. |
| 2011/0079013 A1 * | 4/2011 | Mehring .......... F02C 3/145 60/740 |
| 2011/0079016 A1 | 4/2011 | Etemad et al. |
| 2011/0138819 A1 * | 6/2011 | Tanimura ......... F01D 25/30 60/796 |
| 2012/0285173 A1 | 11/2012 | Poyyapakkam et al. |
| 2012/0324898 A1 | 12/2012 | McMahan et al. |
| 2012/0328996 A1 * | 12/2012 | Shi ............... F23R 3/007 431/253 |
| 2013/0086908 A1 | 4/2013 | Negulescu |
| 2013/0219853 A1 | 8/2013 | Little et al. |
| 2013/0318986 A1 | 12/2013 | Kraemer |
| 2015/0323184 A1 | 11/2015 | Tangirala et al. |
| 2017/0009993 A1 | 1/2017 | Monahan et al. |
| 2017/0016620 A1 | 1/2017 | Masquelet et al. |
| 2017/0130595 A1 * | 5/2017 | Brooks ........... F23R 3/002 |
| 2018/0187563 A1 * | 7/2018 | Laster ........... F23R 3/06 |

FOREIGN PATENT DOCUMENTS

| | | |
|---|---|---|
| EP | 0340149 B1 | 5/1993 |
| GB | 719 380 A | 12/1954 |
| WO | WO2007/102807 A1 | 9/2007 |
| WO | WO2011/031278 A1 | 3/2011 |
| WO | WO2011/031279 A1 | 3/2011 |
| WO | WO2011/031280 A1 | 3/2011 |
| WO | WO2011/031281 A1 | 3/2011 |

OTHER PUBLICATIONS

Zelina, et al., Exploration of Compact Combustors for Reheat Cycle Aero Engine Applications, GT2006-90179, ASME Turbo Expo, 51$^{st}$ ASME International Gas Turbine and Aeroengine Congress and Exposition , Barcelona, Spain, May 2006, pp. 1-11.

Zelina, et al., Fuel Injection Design Optimization for an Ultra-Compact Combustor, American Institute of Aeronautics and Astronautics, ISABE-2003-1089, pp. 1-13.

Zelina, et al., High-Pressure Tests of a High-g, Ultra-Compact Combustor, American Institute of Aeronautics and Astronautics, pp. 1-8.

(56) References Cited

OTHER PUBLICATIONS

Zelina et al., "Operability and Efficiency Performance of Ultra-Compact, High Gravity (g) Combustor Concepts", Proceedings of ASME Turbo Expo '06: 51th ASME International Gas Turbine and Aeroengine Congress and Exposition, pp. 1-9, May 2006.
Zelina, et al., The Behavior of an Ultra-Compact Combustor (UCC) Based On Centrifugally-Enhanced Turbulent Burning Rates, American Institute of Aeronautics and Astronautics, pp. 1-10.
Quaale, et al., Flow Measurements Within A High Swirl Ultra Compact Combustor for Turbine Engines, ISABE-2003-1141, pp. 1-8.
U.S. Appl. No. 15/398,496, filed Jan. 4, 2017.
Wei-Hua, Yang et al., "Experimental Investigation on Impingement-Effusion Film-Cooling Behaviors in Curve Section," Acta Astronautica, Science Direct, vol. 68, Issues 11-12, pp. 1782-1789, Jun.-Jul. 2011.
U.S. Appl. No. 14/801,962, filed Jul. 17, 2015.
U.S. Appl. No. 14/791,684, filed Jul. 6, 2015.
U.S. Appl. No. 61/989,855, filed May 7, 2014.
Strickland et al., "Numerical Simulations of a Lobed Fuel Injector", Physics of Fluids, vol. No. 10, Issue No. 11, pp. 2950-2964, Nov. 1998.
Greenwood, "Numerical Analysis and Optimization of the Ultra Compact Combustor", Air Force Institute of Technology, Wright-Patterson AFB, Mar. 2005.
Jeschke et al., "A Novel Gas Generator Concept for Jet Engines Using a Rotating Combustion Chamber", Proceedings of ASME Turbo Expo 2013: Turbine Technical Conference and Exposition, San Antonio, Texas, USA, vol. No. 2, pp. 1-11, Jun. 3-7, 2013.
International Search Report and Written Opinion issued in connection with corresponding PCT Application No. PCT/US2017/058676 dated Jan. 18, 2018.

\* cited by examiner

GAS TURBINE ENGINE COMBUSTOR COMPRISING AIR INLET TUBES ARRANGED AROUND THE COMBUSTOR

FEDERALLY SPONSORED RESEARCH

This invention was made with government support under contract number FA8650-15-D-2501 of the U.S. Air Force. The government may have certain rights in the invention.

FIELD

The present disclosure relates generally to turbine engines and, more specifically, to a tangential radial inflow combustor assembly for use in a turbine engine.

BACKGROUND

Rotary machines, such as gas turbines, are often used to generate thrust for aircraft. Gas turbines, for example, have a gas path that typically includes, in serial-flow order, an air intake, a compressor section, a combustor, a turbine section, and a gas outlet. Compressor and turbine sections include at least one row of circumferentially-spaced rotating blades coupled within a housing. The compressor section generally provides compressed air to the combustor, where the compressed air is mixed with fuel and combusted to generate combustion gases. The combustion gases flow through the turbine section to power the turbine section. The turbine section may, in turn, power the compressor section and optionally a propulsor, such as a fan or propeller.

In at least some known gas turbines, a first set of guide vanes is coupled between an outlet of the compressor section and an inlet of the combustor. The first set of guide vanes facilitates reducing swirl (i.e., removing bulk swirl) of a flow of air discharged from the compressor such that the flow of air is channeled in a substantially axial direction towards the combustor. Additionally, with such gas turbines a second set of guide vanes may be coupled between an outlet of the combustor and an inlet of the turbine section. The second set of guide vanes facilitates increasing swirl (i.e., reintroducing bulk swirl) of a flow of combustion gasses discharged from the combustor such that flow angle requirements for the inlet of the turbine section are satisfied. However, redirecting the flows of air and combustion gas with the first and second sets of guide vanes may increase operating inefficiencies of the gas turbine. Accordingly, a combustor configured to increase in efficiency of the turbine engine would be useful.

BRIEF DESCRIPTION

Aspects and advantages of the invention will be set forth in part in the following description, or may be obvious from the description, or may be learned through practice of the invention.

In one embodiment of the present disclosure, a combustor is provided for use in a turbine engine. The combustor defines an axial direction, a radial direction, and a circumferential direction. The combustor includes an inner combustion liner and an outer combustion liner. The inner combustor liner and outer combustor liner together define at least in part an interior. The interior includes a combustion chamber and a main portion, the main portion positioned downstream of the combustion chamber and at least partially inward from combustion chamber along the radial direction. The combustor also includes an inlet combustion liner at least partially defining the combustion chamber of the interior and including an inlet assembly. The inlet assembly includes at least two cavity air tubes arranged along the axial direction, each cavity air tube extending between an inlet and an outlet, the outlet of each cavity air tube in airflow communication with the combustion chamber for providing the combustion chamber with a flow of air.

In certain exemplary embodiments the inlet assembly of the inlet combustion liner further comprises at least four cavity air tubes arranged along the axial direction, wherein the at least four cavity air tubes include a first cavity air tube, a second cavity air tube, a third cavity air tube, and a fourth cavity air tube.

For example, in certain of these exemplary embodiments the first and second cavity air tubes define a spacing along the axial direction that is substantially equal to a spacing along the axial direction defined by the third and fourth cavity air tubes, and the second and third cavity air tubes define a spacing along the axial direction that is greater than the spacing along the axial direction of the first and second cavity air tubes.

Additionally, in certain of these exemplary embodiments each of the cavity air tubes of the inlet assembly defines a substantially uniform diameter as one another. Alternatively, in certain of these embodiments the first and second cavity air tubes define a substantially uniform diameter as one another, the third and fourth cavity air tubes also define a substantially uniform diameter as one another, and the diameter of the first and second cavity air tubes is different than the diameter of the third and fourth cavity air tubes.

For example, in others of these exemplary embodiments the inlet assembly further includes a fuel injector through the inlet combustion liner and in fluid communication with the combustion chamber, wherein the fuel injector is spaced substantially evenly between the second cavity air tube and the third cavity air tube along the axial direction.

In certain exemplary embodiments the inlet assembly further comprises a fuel injector through the inlet combustion liner and in fluid communication with the combustion chamber at a location downstream of the outlets of each of the cavity air tubes of the inlet assembly. For example, in certain of these embodiments the fuel injector of the inlet assembly defines a separation angle with the outlets of the cavity air tubes of the inlet assembly, wherein the separation angle is greater than about one degree and less than about ten degrees.

In certain exemplary embodiments each of the cavity air tubes defines a diameter greater than about 0.1 inches and less than about 0.75 inches. For example, in certain of exemplary embodiments each of the cavity air tubes defines a diameter greater than about 0.2 inches and less than about 0.5 inches.

In certain exemplary embodiments the inlet combustion liner defines a tangential reference line, wherein the plurality of cavity air tubes each define a centerline, and wherein the centerlines of each of the cavity air tubes defines an approach angle with the tangential reference line between about five degrees and about seventy-five degrees. For example, in certain exemplary embodiments the approach angle is between about ten degrees and about forty-five degrees.

In certain exemplary embodiments the radial direction and the circumferential direction together define a reference plane extending through a first cavity air tube of the at least two cavity air tubes of the inlet assembly, wherein the first cavity air tube defines a centerline, and wherein the centerline of the first cavity air tube defines an angle with the reference plane between about negative twenty degrees and about twenty degrees.

In certain exemplary embodiments the inlet combustion liner further comprises a plurality of inlet assemblies spaced along the circumferential direction, wherein each of the plurality of inlets assemblies are configured in substantially the same manner.

In certain exemplary embodiments the inner combustion liner defines a plurality of dilution holes in airflow communication with the least one of the combustion chamber or the main portion of the interior for providing additional airflow to the interior.

In certain exemplary embodiments the inlet combustion liner extends between the outer combustion liner and the inner combustor liner generally along the axial direction.

In certain exemplary embodiments the inlets of the cavity air tubes are configured as bell-mouth inlets.

In still other exemplary embodiments of the present disclosure, a turbine engine is provided. The turbine engine includes a compressor assembly configured to discharge compressed air therefrom, and a combustor in airflow communication with the compressor assembly at a location downstream of the compressor assembly. The combustor defines an axial direction, a radial direction, and a circumferential direction. The combustor includes an inner combustion liner and an outer combustion liner, the inner combustor liner and outer combustor liner together defining at least in part an interior. The interior includes a combustion chamber and a main portion, the main portion positioned downstream of the combustion chamber and at least partially inward from combustion chamber along the radial direction. The combustor also includes an inlet combustion liner at least partially defining the combustion chamber of the interior and including an inlet assembly. The inlet assembly includes at least two cavity air tubes arranged along the axial direction, each cavity air tube extending between an inlet and an outlet, the outlet of each cavity air tube in airflow communication with the combustion chamber for providing the combustion chamber with a flow of air.

In certain exemplary embodiments the inlet assembly of the inlet combustion liner further includes at least four cavity air tubes arranged along the axial direction, wherein the at least four cavity air tubes include a first cavity air tube, a second cavity air tube, a third cavity air tube, and a fourth cavity air tube. For example, in certain exemplary embodiments the first and second cavity air tubes define a spacing along the axial direction that is substantially equal to a spacing along the axial direction defined by the third and fourth cavity air tubes, wherein the second and third cavity air tubes define a spacing along the axial direction that is greater than the spacing along the axial direction of the first and second cavity air tubes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
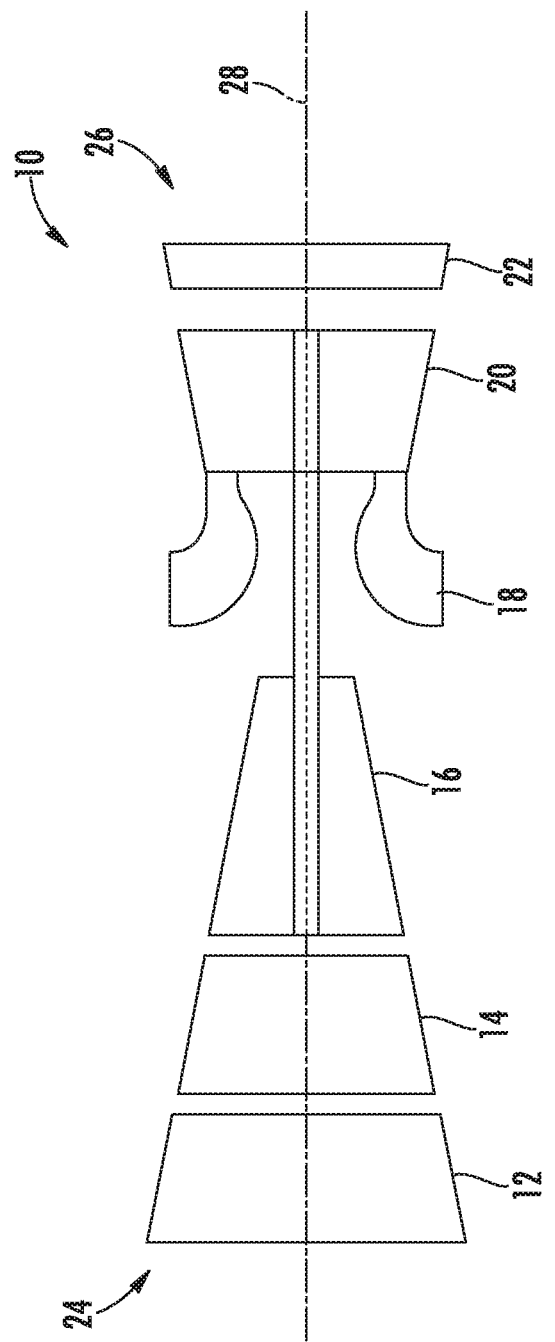
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Embodiments of the present disclosure relate to a high-g, compact combustor assembly including tangential radial inflow (TRI) combustors having air inlet assemblies configured to reduce flame out and increase flame stabilization, while maintaining a high g-range within the combustor (described below). More specifically, the combustor includes an inner combustion liner and an outer combustion liner positioned such that an interior is defined therebetween. The liners are contoured such that the interior includes a combustion chamber and a main portion extending radially inward from the combustion chamber. Additionally, an inlet combustion liner is provided at an upstream end of the combustion chamber of the interior combustion chamber, the inlet combustion liner having one or more inlet assemblies configured to discharge air into the combustion chamber such that it has a predetermined angular momentum, thereby defining a bulk swirl airflow.

Referring now to the Figures, FIG. 1 is a schematic illustration of an exemplary turbine engine 10 including a fan assembly 12; a compressor section having a low-pressure or booster compressor assembly 14 and a high-pressure compressor assembly 16; a combustor assembly 18; and a turbine section having a high-pressure turbine assembly 20 and a low-pressure turbine assembly 22. The fan assembly 12, compressor section, combustor assembly 18, and a turbine section are all arranged in serial flow order. The turbine engine 10 also has an intake 24, or inlet, and an exhaust 26, or outlet. The turbine engine 10 further includes a centerline 28 about which fan assembly 12, booster compressor assembly 14, high-pressure compressor assembly 16, and turbine assemblies 20 and 22 rotate.

In operation, air entering the turbine engine 10 through the intake 24 is channeled through the fan assembly 12 towards the booster compressor assembly 14. Compressed air is discharged from the booster compressor assembly 14 towards the high-pressure compressor assembly 16. Highly compressed air is channeled from the high-pressure compressor assembly 16 towards the combustor assembly 18, mixed with fuel, and the mixture is combusted within combustor assembly 18. High temperature combustion gas generated by the combustor assembly 18 is channeled towards the turbine assemblies 20 and 22. The combustion gas is subsequently discharged from turbine engine 10 via the exhaust 26.

As will be appreciated, in certain embodiments, the turbine engine 10 may be configured as any suitable gas turbine engine. For example, in certain embodiments, the turbine engine 10 may generally be configured as a turbofan engine or a turboprop engine. Alternatively, however, in other embodiments the turbine engine 10 may instead be configured as, e.g., a turboshaft engine, a turbojet engine, or any other suitable aeronautical gas turbine engine 10. Further, still, in other embodiments the turbine engine 10 may be configured as an aeroderivative gas turbine engine (e.g., for nautical uses), a utility gas turbine engine (e.g., for power generation), etc.

Figure 2:
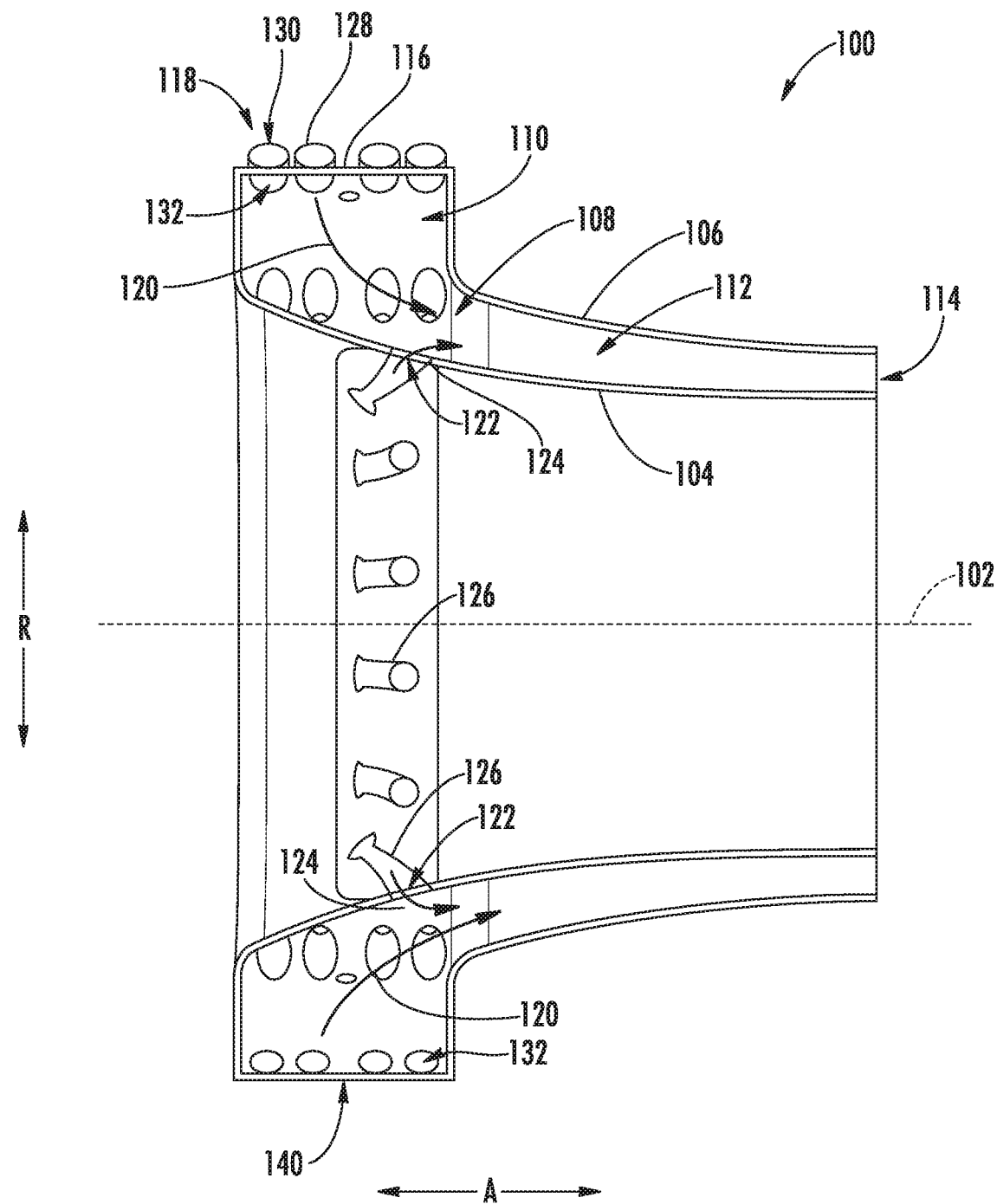
FIG. 2 is a side, schematic, cross-sectional view of a combustor assembly in accordance with an exemplary embodiment of the present disclosure.

Referring now to FIG. 2, a cross-sectional view is provided of an exemplary combustor 100 that may be used in a gas turbine engine. For example, the exemplary combustor 100 of FIG. 2 may be configured in a similar manner as exemplary combustor assembly 18 incorporated in the turbine engine 10 of FIG. 1. As depicted, the exemplary combustor 100 generally defines an axial direction A extending along an axial centerline 102, a radial direction R, and a circumferential direction C (i.e., a direction extending about the axial direction A; see FIG. 3). The axial centerline 102 may align with a centerline of a turbine engine within which it is installed (e.g., the centerline 28 of the turbine engine 10 of FIG. 1).

Additionally, for the exemplary embodiment of FIG. 2, the combustor 100 includes an inner combustion liner 104 and an outer combustion liner 106. The inner combustion liner 104 and outer combustion liner 106 together define at least in part an interior 108 therebetween. The interior 108, in turn, includes a combustion chamber 110, a main portion 112, and a flow outlet 114. The main portion 112 is positioned downstream of the combustion chamber 110 and at least partially inward from the combustion chamber 110 along the radial direction R, e.g., at least partially inward of the combustion chamber 110 along the radial direction R and downstream of the combustion chamber 110. Additionally, the flow outlet 114 is located downstream of the main portion 112 for discharging combustion gases from the interior 108.

The exemplary combustor 100 further includes an inlet combustion liner 116 at least partially defining the combustion chamber 110 of the interior 108. The inlet combustion liner 116, for the embodiment depicted, extends between the inner combustion liner 104 and outer combustion liner 106, generally along the axial direction A. As will be described in greater detail below, the inlet combustion liner 116 includes an inlet assembly 118 for providing the interior 108 with a flow of air, such as compressed air, from a compressor section of a turbine engine within which the combustor 100 is installed. More specifically, for the embodiment depicted, the inlet combustion liner 116 of the combustor 100 includes a plurality of inlet assemblies 118 spaced substantially evenly along the circumferential direction C to provide a cavity airflow 120 to the interior 108 in a manner such that the cavity airflow 120 has a desired swirl and g-level. For the embodiment depicted, each of the plurality of inlet assemblies 118 are configured in substantially the same manner as one another.

In addition, a plurality of dilution holes 122 are formed in the inner combustion liner 104. The plurality of dilution holes 122 are in airflow communication with at least one of the combustion chamber 110 or the main portion 112 of the interior 108 for providing additional airflow, or dilution airflow 124, to the interior 108. Moreover, although not depicted, one or both of the inner combustion liner 104 or outer combustion liner 106 may further include cooling holes, such as film cooling holes, to assist with maintaining a temperature of the inner combustion liner 104 and outer combustion liner 106 within a desired temperature threshold. The plurality of dilution holes 122 may discharge the dilution airflow 124 at a greater flow rate than a cooling airflow through the cooling holes (not shown). The dilution airflow 124 may therefore reduce a fuel-air ratio within the interior 108. Notably, the exemplary dilution holes 122 depicted are configured such that dilution airflow 124 discharged therefrom flows helically relative to the axial centerline 102 of the combustor 100, such that an angular momentum of cavity airflow 120 (discussed in greater detail below) is maintained when dilution airflow 124 mixes with cavity airflow 120. Moreover, in the exemplary embodiment depicted, each dilution hole 122 includes a chute 126 associated therewith and coupled to inner combustion liner 104. The chute 126 facilitates channeling airflow from a source (not shown) and through dilution holes 122. In an alternative embodiment, however, chutes 126 may be omitted from combustor 100.

As described above, embodiments of the present disclosure relate to a high-g, compact, or tangential radial inflow (TRI) combustor 100. More specifically, the inner combustion liner 104 and outer combustion liner 106 are convex relative to the axial centerline 102 of the combustor 100 such that combustion chamber 110 is defined at a radially outermost region of combustor 100. To facilitate inducing bulk swirl in the cavity airflow 120, the inlet assemblies 118 of the inlet combustion liner 116 are oriented to discharge the cavity airflow 120 circumferentially and radially into combustion chamber 110.

Figure 3:
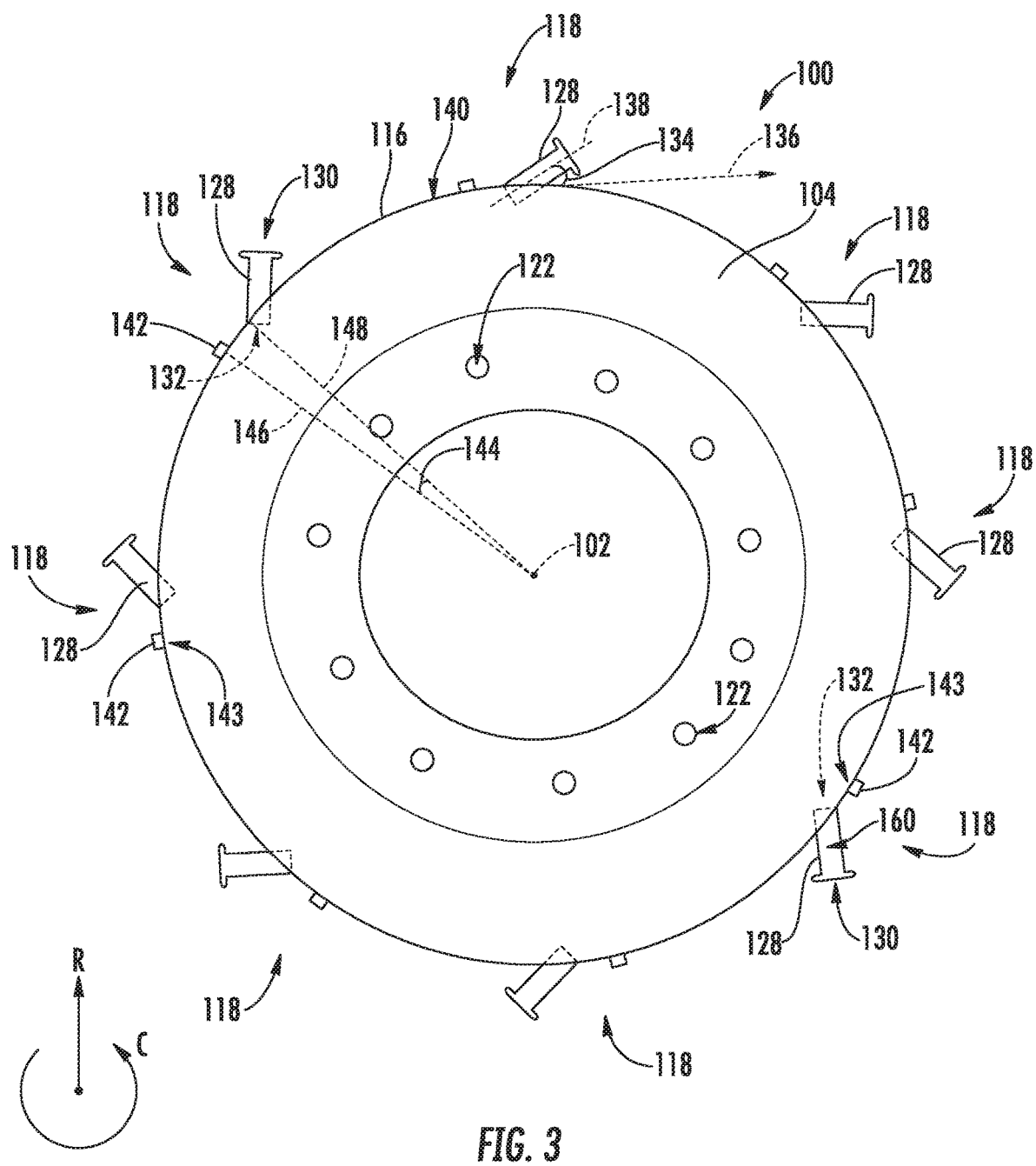
FIG. 3 is a schematic, forward end view of the exemplary combustor assembly of FIG. 2
Figure 4:
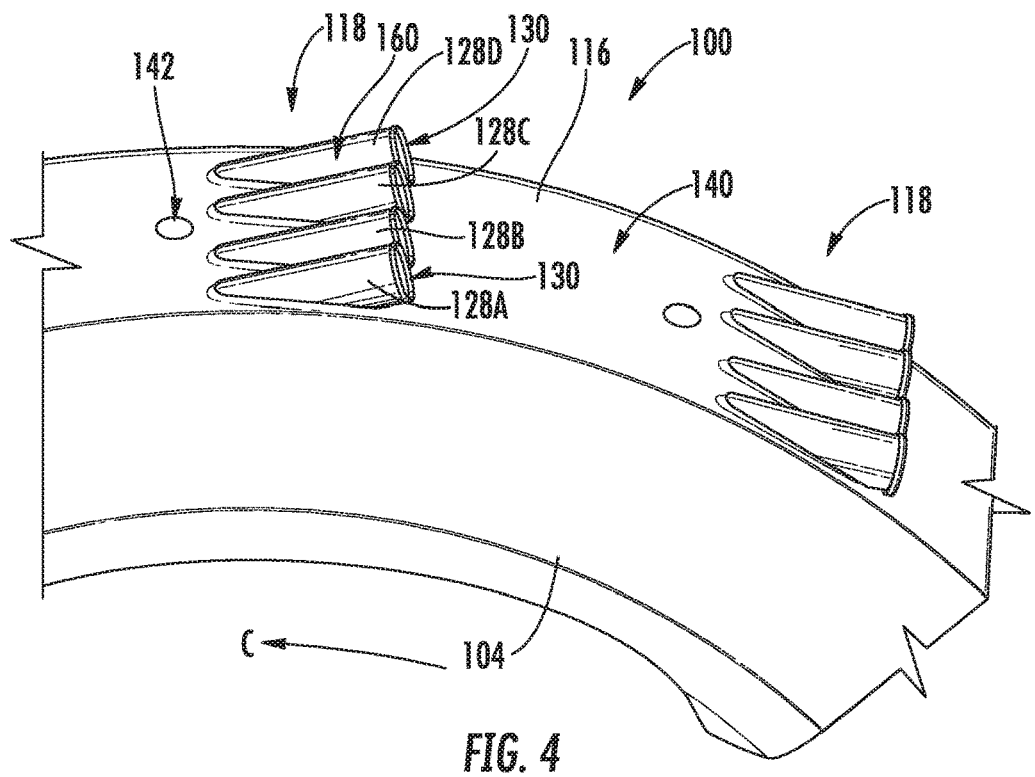
FIG. 4 is a perspective view of a section of the forward end of the exemplary combustor assembly of FIG. 2.

Referring still to FIG. 2, and now also to FIGS. 3 and 4, additional views of the exemplary combustor 100 and inlet combustion liner 116 of FIG. 2 are provided. More specifically, FIG. 3 provides a forward end view of the combustor 100 along the axial direction A of the combustor 100; and FIG. 4 provides a perspective view of the forward end of the combustor 100, and more specifically of the inlet combustion liner 116 of the combustor 100.

Referring particularly to a first of the plurality of inlet assemblies 118 of the inlet combustion liner 116, the inlet assembly 118 includes at least two cavity air tubes 128 arranged along the axial direction A and up to about ten cavity air tubes 128 arranged along the axial direction A (the "cavity air tube" may also be referred to as "cavity air jet"). For example, in certain embodiments, the inlet assembly 118 may include two cavity air tubes 128, between two and four cavity air tubes 128, at least four cavity air tubes 128, up to eight cavity air tubes 128, or up to ten cavity air tubes 128. As is depicted, each cavity air tube 128 extends between an inlet 130 and an outlet 132 (see FIG. 3), with the outlet 132 of each cavity air tube 128 being in airflow communication with the interior 108 for providing the interior 108 with a flow of air in an at least partially inward tangential/circumferential and radial direction C, R. More specifically, for the embodiment depicted, the outlet 132 of each cavity air tube 128 is in airflow communication with the combustion chamber 110 of the interior 108 for providing the combustion chamber 110 with a flow of air, or rather, the cavity airflow 120 (it being appreciated that in other exemplary embodiments the outlets 132 may instead be in airflow communication with the main portion 112 of the interior 108). Additionally, each cavity air tube 128 includes a body section 160 extending between the inlet 130 and outlet 132. The body section 160 extends outwardly from an outer surface 140 of the inlet combustion liner 116.

More specifically, for the embodiment depicted, the inlet assembly 118 includes four cavity air tubes 128 arranged along the axial direction A. The four cavity air tubes 128 includes a first cavity air tube 128A, a second cavity air tube 128B, a third cavity air tube 128C, and a fourth cavity air tube 128D arranged along the axial direction A. Notably, as used herein, the term "arranged along the axial direction A" refers to each of the cavity air tubes 128 of a particular inlet assembly 118 having substantially the same circumferential position, for example, the outlets 132 of each of the cavity air tubes 128 having substantially the same circumferential positions.

As is also depicted, each of the plurality of cavity air tubes 128 of the inlet assembly 118 of the inlet combustion liner 116 are oriented such that the cavity airflow 120 provided to the combustion chamber 110 has a predetermined angular momentum (i.e., a bulk swirl) and defines a desired "g-range" (i.e., a measure equal to a ratio of centripetal acceleration to the gravitational constant, g; discussed in greater detail below). The predetermined angular momentum may be selected to facilitate a flow angle requirement for an airflow entering a turbine of a turbine engine 10 within which the combustor 100 is installed (e.g., the high pressure turbine 20 of the turbine engine 10 of FIG. 1)

More specifically, in order to provide the cavity airflow 120 with the desired angular momentum and g-range, the cavity air tubes 128 are oriented at an approach angle 134. For example, as may be seen most clearly in FIG. 3, the combustor 100 defines a tangential reference line 136, and each of the cavity air tubes 128 defines a centerline 138. The tangential reference line 136 extends tangentially from the outer surface 140 of the inlet combustion liner 116, originating from a circumferential position where the centerline 138 of one of the cavity air tubes 128 would intersect the outer surface 140 of the inlet combustion liner 116. For the embodiment depicted, the approach angle 134 is between about five degrees and about seventy-five degrees. More specifically, for the embodiment depicted, the approach angle 134 is between about ten degrees and about forty-five degrees, such as between about twelve degrees and about thirty degrees.

As may also be seen, the inlet assembly 118 of the inlet combustion liner 116 further includes a fuel injector 142. The fuel injector 142 extends through the inlet combustion liner 116 to a fuel injector opening 143 and is in fluid communication with the combustion chamber 110 of the interior 108 through the fuel injector opening 143 at a location downstream of the outlets 132 of each of the cavity air tubes 128 of the inlet assembly 118. Accordingly, the fuel injectors 142 define a circumferential spacing with each of the cavity air tubes 128 of the inlet assembly 118. The circumferential spacing may be defined by a separation angle 144 relative to the axial centerline 102 of the combustor 100. The separation angle 144 refers to a minimum angle between a reference line 146 extending from the axial centerline 102 to a center of the fuel injector opening 143 of the fuel injector 142 of the inlet assembly 118 and a reference line 148 extending from the axial centerline 102 to a circumferential position aligned with a center of an outlet 132 of a cavity air tube 128 of the inlet assembly 118. For the embodiment depicted, the separation angle 144 is greater than about one degree and less than about ten degrees, such as between about two degrees and about six degrees. It should be appreciated, however, that in other embodiments, the separation angle 144 may have any other value. Further, in other embodiments, each inlet assembly 118 may include any suitable number of fuel injectors 142. For example, in other embodiments, each inlet assembly 118 may include between one and ten fuel injectors 142. Additionally, or alternatively, each inlet assembly 118 may include one fuel injector per every two cavity air tubes 128, per every three cavity air tubes, or per every four cavity air tubes 128.

Figure 5:
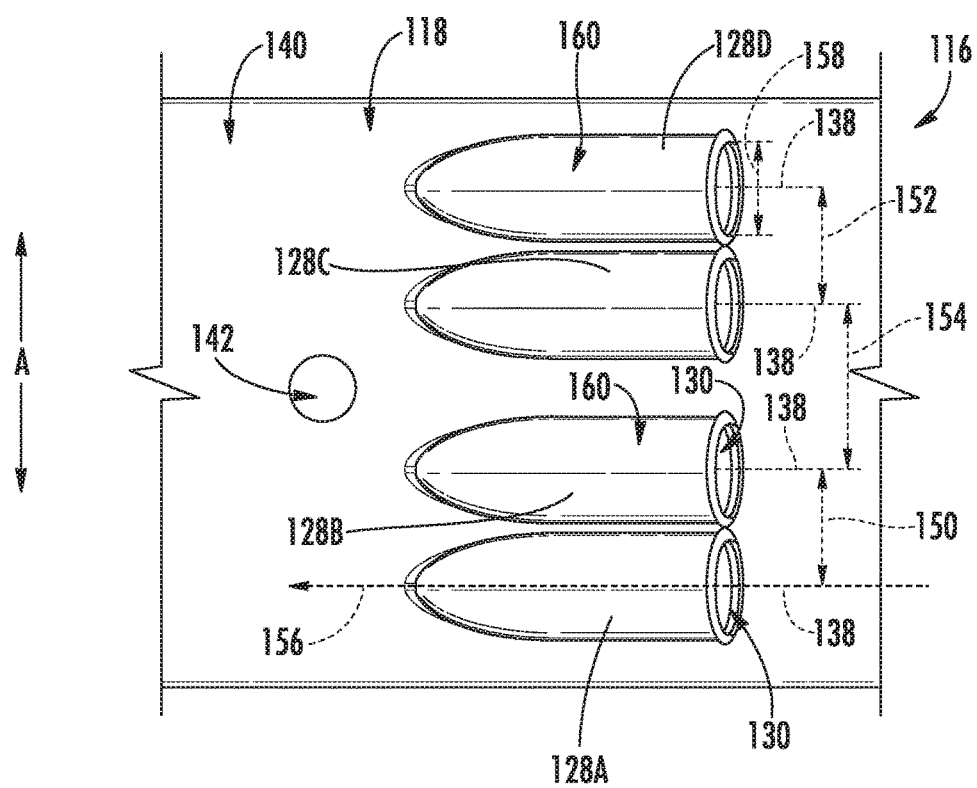
FIG. 5 is a plan view of an inlet combustion liner of the exemplary combustor assembly of FIG. 2 in accordance with an exemplary embodiment of the present disclosure.

Referring now also to FIG. 5, a radially outer view of the inlet assembly 118 of the inlet combustion liner 116 described above is provided. As noted, the exemplary inlet assembly 118 includes the first cavity air tube 128A, the second cavity air tube 128B, the third cavity air tube 128C, and the fourth cavity air tube 128D, each arranged along the axial direction A. Notably, for the embodiment depicted, the cavity air tubes 128 are spaced along the axial direction A. The spacing of the cavity air tubes 128 along the axial direction A and on either side of the fuel injector 142 (and fuel injector opening 143), in conjunction with the fuel injector 142 (and fuel injector opening 143) being located azimuthally downstream of the cavity air tubes 128 (defined by the separation angle 144) provides for an increased flame stabilization during operation of the combustor 100 and allows for the fuel spray to develop and mix with the cavity airflow 120 from the cavity air tubes 128. The spacing along the axial direction A between adjacent cavity air tubes 128 is defined as a distance along the axial direction A from the centerline 138 of one cavity air tube 128 to the centerline 138 of the adjacent cavity air tube 128.

For example, the first and second cavity air tubes 128A, 128B define a spacing 150 along the axial direction A that is substantially equal to a spacing 152 along the axial direction A defined by the third and fourth cavity air tubes 128C, 128D. By contrast, however, the second and third cavity air tubes 128B, 128C define a spacing 154 along the axial direction A that is greater than the spacing 150 along the axial direction A of the first and second cavity air tubes 128A, 128B, and greater than the spacing 152 along the axial direction A of the third and fourth cavity air tubes 128C, 128D. Moreover, for the embodiment depicted, the fuel injector 142 of the inlet assembly 118 is spaced substantially evenly between the second cavity air tube 128B and the third cavity air tube 128C along the axial direction A. Notably, for the embodiment depicted, the fuel injector 142 is also positioned substantially halfway along a length of the inlet combustion liner 116 along the axial direction A.

As may also be seen in FIG. 5, each of the cavity air tubes 128 is oriented to generate the desired swirl of the cavity air flow 120 along the circumferential direction C. As such, each of the cavity air tubes 128 is substantially aligned with the circumferential direction C. For example, as is depicted in FIG. 5, the radial direction R and the circumferential direction C of the combustor 100 together define a reference plane 156 extending through the first cavity air tube 128A of the inlet assembly 118. The centerline 138 of the first cavity air tube 128A defines an angle (not shown) with reference plane 156 between about negative twenty degrees and about twenty degrees such as between about negative ten degrees and about ten degrees. More specifically, for the embodiment depicted, the centerline 138 of the first cavity air tube 128A defines an angle with the reference plane 156 between about negative three degrees and about three degrees, and more specifically still, the centerline 138 is parallel to the reference plane 156 for the embodiment depicted. Additionally, for the embodiment of FIG. 5, the centerlines 138 of each of the plurality of cavity air tubes 128 are parallel to one another. However, in other embodiments, one or more of the centerlines 138 of the plurality of cavity air tubes 128 may instead define angles relative to one another.

Furthermore, it should be appreciated that for the embodiment of FIG. 5, each of the cavity air tubes 128 of the inlet assembly 118 defines a substantially uniform diameter 158 (i.e., each of the plurality of cavity air tubes 128 of the inlet assembly 118 define substantially the same diameter 158 as one another). More particularly, referring now also to FIG. 6, providing a cross-sectional view of a cavity air tube 128 of the inlet assembly 118 of FIG. 5 along the centerline 138 of the cavity air tube 128, it will be appreciated that as used herein, the diameter 158 of the cavity air tube 128 refers to a maximum inner diameter within the body section 160 of the cavity air tube 128. As mentioned above, the body section 160 is the portion of the cavity air tube 128 having a substantially constant cross-sectional opening between the inlet 130 and the outlet 132. Notably, for the embodiment depicted, the body section 160 includes a substantially cylindrical opening. However, in other embodiments, the body section 160 may instead include, e.g., an ovular cross-sectional opening or any other suitable cross-sectional opening.

Moreover, for the embodiment depicted, the diameter 158 of each of the cavity air tubes 128 is greater than about 0.1 inches and less than about 0.75 inches. More specifically, for the embodiment depicted, the diameter 158 of each of the cavity air tubes 128 is greater than about 0.2 inches and less than about 0.5 inches. Additionally, as stated, for the embodiment depicted the diameter 158 of each of the cavity air tubes 128 is substantially uniform for a given inlet assembly 118.

Figure 6:
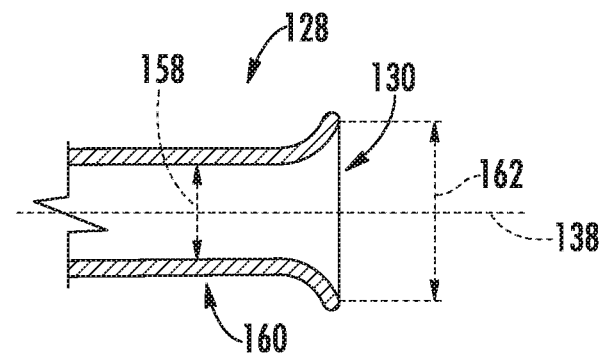
FIG. 6 is a close-up, cross-sectional schematic view of a cavity air tube in accordance with an exemplary embodiment of the present disclosure.

Further, as may also be seen in FIG. 6, the inlets 130 of each of the cavity air tubes 128 are configured as bell-mouth inlets. Accordingly, each of the cavity air tubes 128 defines an inlet diameter 162 that is greater than the diameter 158 of the body section 160. For example, the inlet diameter 162 may be at least about ten percent greater than the diameter 158 of the body section 160, such as at least about fifteen percent greater, such as at least about twenty percent greater, such as at least about thirty percent greater, such as up to about one hundred percent greater.

It should be appreciated, however, that in other exemplary embodiments, one or more of the inlet assemblies 118 of the inlet combustion liner 116 may have any other suitable configuration. For example, referring now briefly to FIG. 7, a radially outer view of an inlet combustion liner 116 of a combustor 100 in accordance with another exemplary embodiment of the present disclosure is provided. The exemplary inlet combustion liner 116 of FIG. 7 may be configured in substantially the same manner as exemplary inlet combustion liner 116 of FIG. 5.

Figure 7:
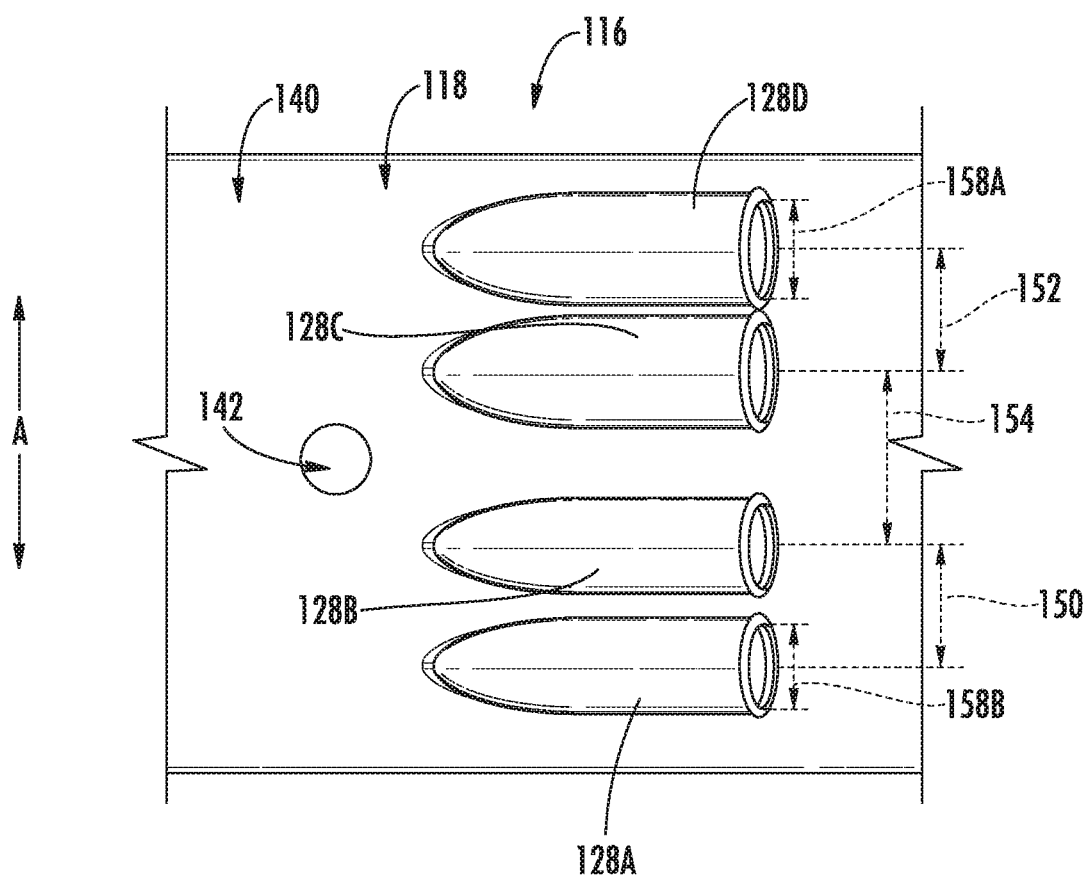
FIG. 7 is a plan view of an inlet combustion liner of a combustor assembly in accordance with another exemplary embodiment of the present disclosure.

For example, the exemplary inlet combustion liner 116 of FIG. 7 includes an inlet assembly 118, the inlet assembly 118 including a first cavity air tube 128A, a second cavity air tube 128B, a third cavity air tube 128C, and a fourth cavity air tube 128D arranged along an axial direction A of the combustor 100. However, for the embodiment of FIG. 7, the first, second, third, and fourth cavity air tubes 128A-D do not define a substantially uniform diameter 158 as one another. More particularly, for the embodiment of FIG. 7, the first and second cavity air tubes 128A, 128B define substantially uniform diameters as one another (i.e., a first diameter 158A) and the third and fourth cavity air tubes 128C, 128D also define substantially uniform diameters 158 as one another (i.e., a second diameter 158B). For the embodiment depicted, the first diameter 158A of the first and second cavity air tubes 128A, 128B is different than the second diameter 158B of the third and fourth cavity air tubes 128C, 128D. For example, the first diameter 158A may be between about two percent and about fifty percent larger than the second diameter 158B, such as between about five percent and about forty percent larger than the second diameter 158B, such as between about ten percent and about twenty-five percent larger the second diameter 158B. Alternately, however, in other embodiments the second diameter 158B may be larger than the first diameter 158A. Notably, as is also depicted, for the embodiment of FIG. 7, the first and second cavity air tubes 128A, 128B define a spacing 150 along the axial direction A that is not equal to a spacing 152 of the third and fourth cavity air tubes 128C, 128D along the axial direction A (e.g., the spacing 150 being between five and fifty percent larger than the spacing 152).

Furthermore, in still other exemplary embodiments, the inlet assemblies 118 of the inlet combustion liner 116 may be configured in still any other suitable manner. For example, in other embodiments, each of the inlet assemblies 118 may not be configured in substantially the same manner as one another, may not be substantially evenly spaced along the circumferential direction C of the combustor 100, may have any other suitable number or arrangement of cavity air tubes 128 (e.g., may include two cavity air tubes 128, three cavity air tubes 128, multiple rows of cavity air tubes 128 spaced along the circumferential direction C, etc.), may include cavity air tubes 128 having a bend or a non-uniform shape along a length thereof, etc. Additionally, or alternatively, each of the plurality of cavity air tubes 128 of an inlet assembly 118 may define different diameters, and further may each define a unique spacing with an adjacent cavity air tube 128.

Inclusion of an inlet combustion liner 116 having inlet assemblies 118 in accordance with one or more embodiments of the present disclosure may ensure that the cavity airflow 120 provided to the combustion chamber 110 defines a desired angular momentum within the combustion chamber 110. As briefly mentioned above, the angular momentum may be measured by a "g-range" of the airflow. The g-range may be measured by the following Equation 1:

$$V_T^2 \div r \div g \qquad \text{(Equation 1),}$$

wherein "$V_T$" is equal to a tangential velocity of the cavity airflow 120, wherein "r" is equal to a radius of the cavity airflow 120 along the radial direction R relative to the axial centerline 102, and wherein "g" is the gravitational constant. More particularly, inclusion of an inlet combustion liner 116 having inlet assemblies 118 in accordance with one or more embodiments the present disclosure may provide for a combustor 100 having a maximum g-range between about 100 and about 10,000, such as between about 500 and about 5,000.

Further, it should be appreciated that inclusion of an inlet combustion liner 116 having inlet assemblies 118 in accordance with one or more embodiments the present disclosure may provide for increased stabilization of a flame within the combustion chamber 110 and improved mixing of the cavity airflow with the fuel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor for use in a turbine engine, the combustor defining an axial direction, a radial direction, and a circumferential direction, the combustor comprising:
    an inner combustion liner;
    an outer combustion liner, the inner combustor liner and outer combustor liner together defining at least in part an interior, the interior comprising a combustion chamber and a main portion, the main portion positioned downstream of the combustion chamber and at least partially inward from combustion chamber along the radial direction; and
    an inlet combustion liner at least partially defining the combustion chamber of the interior and comprising an inlet assembly, the inlet assembly comprising at least two cavity air tubes arranged along the axial direction, each cavity air tube extending between an inlet and an outlet, the outlet of each cavity air tube in airflow communication with the combustion chamber for providing the combustion chamber with a flow of air,
    wherein the inlet assembly of the inlet combustion liner further comprises at least four cavity air tubes arranged along the axial direction, and wherein the at least four cavity air tubes include a first cavity air tube, a second cavity air tube, a third cavity air tube, and a fourth cavity air tube, and
    wherein the first and second cavity air tubes define a spacing along the axial direction that is substantially equal to a spacing along the axial direction defined by the third and fourth cavity air tubes, and wherein the second and third cavity air tubes define a spacing along the axial direction that is greater than the spacing along the axial direction of the first and second cavity air tubes.

2. A combustor for use in a turbine engine, the combustor defining an axial direction, a radial direction, and a circumferential direction, the combustor comprising:
    an inner combustion liner;
    an outer combustion liner, the inner combustor liner and outer combustor liner together defining at least in part an interior, the interior comprising a combustion chamber and a main portion, the main portion positioned downstream of the combustion chamber and at least partially inward from combustion chamber along the radial direction; and
    an inlet combustion liner at least partially defining the combustion chamber of the interior and comprising an inlet assembly, the inlet assembly comprising at least two cavity air tubes arranged along the axial direction, each cavity air tube extending between an inlet and an outlet, the outlet of each cavity air tube in airflow communication with the combustion chamber for providing the combustion chamber with a flow of air,
    wherein the inlet assembly of the inlet combustion liner further comprises at least four cavity air tubes arranged along the axial direction, and wherein the at least four cavity air tubes include a first cavity air tube, a second cavity air tube, a third cavity air tube, and a fourth cavity air tube, and
    wherein the first and second cavity air tubes define a substantially uniform diameter as one another, wherein the third and fourth cavity air tubes also define a substantially uniform diameter as one another, and wherein the diameter of the first and second cavity air tubes is different than the diameter of the third and fourth cavity air tubes.

3. A combustor for use in a turbine engine, the combustor defining an axial direction, a radial direction, and a circumferential direction, the combustor comprising:
    an inner combustion liner;
    an outer combustion liner, the inner combustor liner and outer combustor liner together defining at least in part an interior, the interior comprising a combustion chamber and a main portion, the main portion positioned downstream of the combustion chamber and at least partially inward from combustion chamber along the radial direction; and
    an inlet combustion liner at least partially defining the combustion chamber of the interior and comprising an inlet assembly, the inlet assembly comprising at least two cavity air tubes arranged along the axial direction, each cavity air tube extending between an inlet and an outlet, the outlet of each cavity air tube in airflow communication with the combustion chamber for providing the combustion chamber with a flow of air,
    wherein the inlet assembly of the inlet combustion liner further comprises at least four cavity air tubes arranged along the axial direction, and wherein the at least four cavity air tubes include a first cavity air tube, a second cavity air tube, a third cavity air tube, and a fourth cavity air tube, and wherein the inlet assembly further comprises a fuel injector through the inlet combustion liner and in fluid communication with the combustion chamber, wherein the fuel injector is spaced substantially evenly between the second cavity air tube and the third cavity air tube along the axial direction.

4. A combustor for use in a turbine engine, the combustor defining an axial direction, a radial direction, and a circumferential direction, the combustor comprising:

an inner combustion liner;

an outer combustion liner, the inner combustor liner and outer combustor liner together defining at least in part an interior, the interior comprising a combustion chamber and a main portion, the main portion positioned downstream of the combustion chamber and at least partially inward from combustion chamber along the radial direction; and an inlet combustion liner at least partially defining the combustion chamber of the interior and comprising an inlet assembly, the inlet assembly comprising at least two cavity air tubes arranged along the axial direction, each cavity air tube extending between an inlet and an outlet, the outlet of each cavity air tube in airflow communication with the combustion chamber for providing the combustion chamber with a flow of air, wherein the inlet assembly further comprises a fuel injector through the inlet combustion liner and in fluid communication with the combustion chamber at a location downstream of the outlets of each of the cavity air tubes of the inlet assembly.

5. The combustor of claim 4, wherein each of the cavity air tubes defines a diameter greater than 0.1 inches and less than 0.75 inches.

6. The combustor of claim 5, wherein each of the cavity air tubes defines a diameter greater than 0.2 inches and less than 0.5 inches.

7. The combustor of claim 4, wherein the inlet assembly of the inlet combustion liner further comprises at least four cavity air tubes arranged along the axial direction, and wherein the at least four cavity air tubes include a first cavity air tube, a second cavity air tube, a third cavity air tube, and a fourth cavity air tube.

8. The combustor of claim 7, wherein each of the cavity air tubes of the inlet assembly defines a substantially uniform diameter as one another.

9. The combustor of claim 4, wherein the fuel injector of the inlet assembly defines a separation angle with the outlets of the cavity air tubes of the inlet assembly, wherein the separation angle is greater than one degree and less than ten degrees.

10. The combustor of claim 4, wherein the inlet combustion liner further comprises a plurality of inlet assemblies spaced along the circumferential direction, wherein each of the plurality of inlets assemblies are configured in substantially the same manner.

11. The combustor of claim 4, wherein the inner combustion liner defines a plurality of dilution holes in airflow communication with the least one of the combustion chamber or the main portion of the interior for providing additional airflow to the interior.

12. The combustor of claim 4, wherein the inlet combustion liner extends between the outer combustion liner and the inner combustor liner generally along the axial direction.

13. The combustor of claim 4, wherein the inlets of the cavity air tubes are configured as bell-mouth inlets.

14. A combustor for use in a turbine engine, the combustor defining an axial direction, a radial direction, and a circumferential direction, the combustor comprising:

an inner combustion liner;

an outer combustion liner, the inner combustor liner and outer combustor liner together defining at least in part an interior, the interior comprising a combustion chamber and a main portion, the main portion positioned downstream of the combustion chamber and at least partially inward from combustion chamber along the radial direction; and an inlet combustion liner at least partially defining the combustion chamber of the interior and comprising an inlet assembly, the inlet assembly comprising at least two cavity air tubes arranged along the axial direction, each cavity air tube extending between an inlet and an outlet, the outlet of each cavity air tube in airflow communication with the combustion chamber for providing the combustion chamber with a flow of air, wherein the inlet combustion liner defines a tangential reference line, wherein the plurality of cavity air tubes each define a centerline, and wherein the centerlines of each of the cavity air tubes defines an approach angle with the tangential reference line between five degrees and seventy-five degrees.

15. The combustor of claim 14, wherein the approach angle is between ten degrees and forty-five degrees.

16. A combustor for use in a turbine engine, the combustor defining an axial direction, a radial direction, and a circumferential direction, the combustor comprising:

an inner combustion liner;

an outer combustion liner, the inner combustor liner and outer combustor liner together defining at least in part an interior, the interior comprising a combustion chamber and a main portion, the main portion positioned downstream of the combustion chamber and at least partially inward from combustion chamber along the radial direction; and an inlet combustion liner at least partially defining the combustion chamber of the interior and comprising an inlet assembly, the inlet assembly comprising at least two cavity air tubes arranged along the axial direction, each cavity air tube extending between an inlet and an outlet, the outlet of each cavity air tube in airflow communication with the combustion chamber for providing the combustion chamber with a flow of air, wherein the radial direction and the circumferential direction together define a reference plane extending through a first cavity air tube of the at least two cavity air tubes of the inlet assembly, wherein the first cavity air tube defines a centerline, and wherein the centerline of the first cavity air tube defines an angle with the reference plane between negative twenty degrees and twenty degrees.

17. A turbine engine comprising:

a compressor assembly configured to discharge compressed air therefrom; and a combustor in airflow communication with the compressor assembly at a location downstream of the compressor assembly, the combustor defining an axial direction, a radial direction, and a circumferential direction, the combustor comprising:

an inner combustion liner;

an outer combustion liner, the inner combustor liner and outer combustor liner together defining at least in part an interior, the interior comprising a combustion chamber and a main portion, the main portion positioned downstream of the combustion chamber and at least partially inward from combustion chamber along the radial direction; and an inlet combustion liner at least partially defining the combustion chamber of the interior and comprising an inlet assembly, the inlet assembly comprising at least two cavity air tubes arranged along the axial direction, each cavity air tube extending between an inlet and an outlet, the outlet of each cavity air tube in airflow communication with the combustion chamber for providing the combustion chamber with a flow of air, wherein the inlet assembly of the inlet combustion liner further comprises at least four cavity air tubes arranged along the axial direction, and wherein the at least four cavity air tubes include a first cavity air tube, a second cavity air tube, a third cavity air tube, and a fourth cavity air tube, and wherein the first and second cavity air tubes define a spacing along the axial direction that is substantially equal to a spacing along the axial direction defined by the third and fourth cavity air tubes, and wherein the second and third cavity air tubes define a spacing along the axial direction that is greater than the spacing along the axial direction of the first and second cavity air tubes.

* * * * *